US012619792B2

(12) United States Patent
Chang et al.

(10) Patent No.: US 12,619,792 B2
(45) Date of Patent: May 5, 2026

(54) STORAGE DEVICE WITH ONE-BUTTON DESTRUCTION FUNCTION

(71) Applicant: TEAM GROUP INC., New Taipei City (TW)

(72) Inventors: Chin Feng Chang, New Taipei City (TW); Po Chuan Lin, New Taipei City (TW); Cheng Yu Lee, New Taipei City (TW); Wei Hsiang Wang, New Taipei City (TW)

(73) Assignee: TEAM GROUP INC., New Taipei City (TW)

( * ) Notice: Subject to any disclaimer, the term of this patent is extended or adjusted under 35 U.S.C. 154(b) by 166 days.

(21) Appl. No.: 18/806,746

(22) Filed: Aug. 16, 2024

(65) Prior Publication Data

US 2026/0004006 A1 Jan. 1, 2026

(30) Foreign Application Priority Data

Jun. 27, 2024 (TW) ................................. 113124117

(51) Int. Cl.
G06F 21/79 (2013.01)
H05K 1/02 (2006.01)
(52) U.S. Cl.
CPC ........... *G06F 21/79* (2013.01); *H05K 1/0213* (2013.01); *G06F 2221/2143* (2013.01); *H05K 2201/10053* (2013.01); *H05K 2201/10106* (2013.01); *H05K 2201/10159* (2013.01)
(58) Field of Classification Search
CPC ........... G06F 21/79; G06F 2221/2143; H05K 1/0213; H05K 2201/10053; H05K 2201/10106; H05K 2201/10159

USPC .......................................................... 726/34
See application file for complete search history.

(56) References Cited

U.S. PATENT DOCUMENTS

| | | | | |
|---|---|---|---|---|
| 11,210,031 B1 * | 12/2021 | Mekhanik | ............. | G06F 3/0659 |
| 11,231,988 B1 * | 1/2022 | Neustrom | ............. | G06F 9/4416 |
| 2011/0154060 A1 * | 6/2011 | Guyot | ................... | H04L 9/0894 |
| | | | | 713/193 |
| 2014/0068277 A1 * | 3/2014 | Metzger | ................. | G06F 21/79 |
| | | | | 713/193 |
| 2015/0121537 A1 * | 4/2015 | Ellis | ........................ | G06F 21/60 |
| | | | | 726/26 |
| 2015/0304108 A1 * | 10/2015 | Obukhov | ............ | G06F 21/6209 |
| | | | | 713/193 |
| 2018/0039437 A1 * | 2/2018 | Olarig | ................. | G06F 21/6218 |
| 2018/0096172 A1 * | 4/2018 | Lu | ............................ | G06F 21/79 |
| 2021/0303736 A1 * | 9/2021 | Kim | ........................ | G11C 29/42 |
| 2022/0405788 A1 * | 12/2022 | Tachinami | ......... | G06Q 30/0205 |

* cited by examiner

*Primary Examiner* — Badri Narayanan Champakesan
(74) *Attorney, Agent, or Firm* — WPAT, PC

(57) ABSTRACT

The present invention provides a storage device with one-button destruction function, which comprises a case, a circuit board, a control unit, a storage unit, a button, and a power supply. The destruction function comprises steps of: generating a pressing signal when the button is pressed; the control unit obtains a pressing time according to the pressing signal; the control unit generating an erasing signal according to a time threshold value, a second time threshold value, and the pressing time; and the control unit executing a destruction process on the storage unit according to the erasing signal.

15 Claims, 4 Drawing Sheets

STORAGE DEVICE WITH ONE-BUTTON DESTRUCTION FUNCTION

BACKGROUND OF THE INVENTION

As technology becomes more developed, computers are now widespread everywhere, including home personal computers, notebook computers, computers used by people in companies and schools, computers that execute process steps in industrial manufacturing or laboratory operations, and computers that collect data.

In order to store users' application information, media, data, and other information content, a computer must be equipped with a storage device.

These common 3C products in daily life store various personal information, private photos, text messages, and phone calls. If the stored data is incompletely deleted, people with bad intentions may use the file recovery technology to steal the data. More commercial servers and notebook computers are beginning to adopt SSDs, meaning that important internal data of enterprises may be leaked due to the loss of these SSDs.

In today's digital age, individuals and enterprises are constantly at risk of data breaches. In an era of increasing data breaches and cyber-attacks, ensuring secure handling of personal and business data has become a vital issue.

Because storage products have data security requirements for special applications, the storage and destruction of data has always been a valued part.

The full name of SSD is solid-state drive. It was originally designed to replace traditional hard disk. Its main device used to store data is an integrated circuit. Compared with a traditional hard disk, which uses a motor to rotate internal disks and therefore read and write data through the rotating disk and related access control circuits, the storage devices inside an SSD are all integrated circuits. Consequently, compared with traditional hard drives, there are no magnetic disk and internal mechanical part. Besides, the data access mechanism of SSDs is completely different from that of traditional hard drives.

The most important component of SSD is non-volatile memory, such as NAND flash memory and NOR memory. In addition, according to the storage methods, it is classified into the single-level cell (SLC), multi-level cell (MLC), triple-level cell (TLC), quad-level cell (QLC), penta-level cell, and even the 3D NAND flash memory.

The common hard drive data destruction methods can be divided into erasing electronic files and physically destroying the hard drive.

However, compared with traditional hard disks, the key reason why SSDs are more difficult to delete data is that the way SSDs store data is completely different from traditional hard disks. Because SSD uses flash memory to store data, this also leads to differences in the storage methods of SSD and traditional hard drives.

First, data cannot be written repeatedly. The smallest storage space in flash memory is called a cell. A cell can store one bit of data, which can be 1 or 0. This is the so-called SLC storage method. To write new data, it is required to clear the cell by charging. A cell using different voltage levels to store 2 bits of data is the MLC. It also has the feature that it cannot be written repeatedly. A cell using different voltage levels to store 3 bits of data is the TLC. It also has the feature that data cannot be written repeatedly. A cell using different potentials to store 4 bits of data is the QLC. It also has the feature that data cannot be written repeatedly. Moreover, a cell using different potentials to store 5 bits of data is the PLC. Likewise, it also has the feature that data cannot be written repeatedly.

The method of deleting data in flash memory is also different from that of hard disks. It must be written one by one and erased in a batch. The erasing speed of SSD will be much slower than the reading speed.

Therefore, for the data destruction of solid-state drives, physical destruction is necessary.

There are many common physical methods of destroying hard drives, such as soaking in water, destroying the hard drive body, destroying hard drive particles, etc. In addition to physically destroying the hard drive body, it can also destroy the internal circuitry of the hard drive to achieve data destruction. In view of this, the present invention provides a storage device destruction function triggered by a physical button. The difference in trigger duration is used to enable the storage controller to determine the destruction method, so that the two destruction methods, the hardware quick erase and the software quick erase, coexist and have a simple control method. Besides, the present invention adopts continuous erasing. If the power is cut off after erasing is started, erasing can be continued the next time the power is turned on.

SUMMARY OF THE INVENTION

An objective of the present invention is to provide a storage device with one-button destruction function triggered by a physical button. The difference in trigger duration is used to enable the storage controller determining the destruction method.

To achieve the above objective, the present invention provides a storage device with one-button destruction function, which comprises a circuit board, a first button, a second button, a control unit, a storage unit, a boost converter, a power supply, and a case. Press the first button or the second button to generate a pressing signal to the control unit. The control unit obtains a pressing time. When the pressing time is greater than a first time threshold value, the control unit transmits a first erasing voltage to the storage unit for erasing a plurality of storage blocks. When the pressing time is greater than a second time threshold value, the control unit transmits a second erasing voltage to the boost converter. The boost converter generates a voltage signal correspondingly to the storage unit for breaking down the storage unit.

According to an embodiment of the present invention, the first button is disposed on the circuit board.

According to an embodiment of the present invention, the second button is disposed on the case.

According to an embodiment of the present invention, the circuit board is disposed inside the case.

According to an embodiment of the present invention, the control unit is disposed on the circuit board and the connected electrically to the first button and the second button.

According to an embodiment of the present invention, the storage unit is disposed on the circuit board and connected electrically to the control unit.

According to an embodiment of the present invention, the boost converter is connected electrically to the control unit and the storage unit.

According to an embodiment of the present invention, the power supply is disposed inside the case and connected electrically to the control unit and the boost converter.

According to an embodiment of the present invention, the storage unit includes a plurality of storage blocks.

According to an embodiment of the present invention, a first light-emitting unit is further disposed on the circuit board, and the control unit is connected electrically to the first light-emitting unit.

According to an embodiment of the present invention, a second light-emitting unit is further disposed on the case, and the control unit is connected electrically to the second light-emitting unit.

According to an embodiment of the present invention, pressing the first button or the second button generates a pressing signal to the control unit. The control unit obtains a pressing time according to the pressing signal.

According to an embodiment of the present invention, if the pressing time is smaller than a first time threshold value, the control unit transmits a first light-emitting signal to the first light-emitting unit and the second light-emitting unit.

According to an embodiment of the present invention, if the pressing time is greater than the first time threshold value, the control unit transmits a second light-emitting signal to the first light-emitting unit and the second light-emitting unit.

According to an embodiment of the present invention, the first time threshold value is smaller than a second time threshold value. If the pressing time is greater than the first time threshold value and smaller than the second time threshold value, the control unit transmits a first erasing voltage to the storage unit for erasing the plurality of storage blocks of the storage unit and executing software erasing on the storage unit.

According to an embodiment of the present invention, the first erasing voltage is greater than a threshold voltage of each of the plurality of storage blocks.

According to an embodiment of the present invention, if the pressing time is greater than the second time threshold value, the control unit transmits a second erasing voltage to the boost converter. The boost converter generates a voltage signal correspondingly to the storage unit. The voltage signal is greater than an operating voltage of the storage unit for breaking down the storage unit.

According to an embodiment of the present invention, the operating voltage is different for different brands of SSD, normally being 5V or 3.3V. The operating voltage according to the present invention can be comprehended as the maximum operating voltage of the storage unit.

According to an embodiment of the present invention, the first light-emitting unit and the second light-emitting unit are light-emitting diodes.

According to an embodiment of the present invention, the first light-emitting unit and the second light-emitting unit receive the first light-emitting signal and transmit a first light beam.

According to an embodiment of the present invention, the first light-emitting unit and the second light-emitting unit receive the second light-emitting signal and transmit a second light beam.

Another objective of the present invention is to provide a method for determining destruction method of storage device triggered by a physical button. The difference in trigger duration is used to enable the storage controller to determine the destruction method.

To achieve the above objective, the present invention provides a method for determining destruction method of storage device applicable to a storage device, which comprises a circuit board, a first button, a second button, a control unit, a storage unit, a boost converter, a power supply, and a case. Press the first button or the second button to generate a pressing signal to the control unit. The control unit obtains a pressing time. When the pressing time is greater than a first time threshold value, the control unit transmits a first erasing voltage to the storage unit for erasing a plurality of storage blocks. When the pressing time is greater than a second time threshold value, the control unit transmits a second erasing voltage to the boost converter. The boost converter generates a voltage signal correspondingly to the storage unit for breaking down the storage unit.

According to an embodiment of the present invention, a user presses and holds the first button or the second button to generates pressing signal to the control unit. The control unit obtains a pressing time according to the pressing signal.

According to an embodiment of the present invention, a first light-emitting unit is further disposed on the circuit board, and the control unit is connected electrically to the first light-emitting unit.

According to an embodiment of the present invention, a second light-emitting unit is further disposed on the case, and the control unit is connected electrically to the second light-emitting unit.

According to an embodiment of the present invention, if the pressing time is smaller than a first time threshold value, the control unit transmits a first light-emitting signal to the first light-emitting unit and the second light-emitting unit.

According to an embodiment of the present invention, the first time threshold value is smaller than a second time threshold value.

According to an embodiment of the present invention, if the pressing time is greater than the first time threshold value and smaller than the second time threshold value, the control unit transmits a second light-emitting signal to the first light-emitting unit and the second light-emitting unit. The control unit transmits a first erasing voltage to the storage unit for erasing the plurality of storage blocks of the storage unit and executing software erasing on the storage unit.

According to an embodiment of the present invention, the first erasing voltage is greater than a threshold voltage of each of the plurality of storage blocks.

According to an embodiment of the present invention, if the pressing time is greater than the second time threshold value, the control unit transmits the second light-emitting signal to the first light-emitting unit and the second light-emitting unit. The control unit transmits the second erasing voltage to the boost converter. The boost converter generates a voltage signal correspondingly to the storage unit for breaking down the storage unit and executing hardware erasing.

According to an embodiment of the present invention, the voltage signal is greater than an operating voltage of the storage unit.

According to an embodiment of the present invention, the operating voltage is different for different brands of SSD, normally being 5V or 3.3V. The operating voltage according to the present invention can be comprehended as the maximum operating voltage of the storage unit.

According to an embodiment of the present invention, the first light-emitting unit and the second light-emitting unit are light-emitting diodes.

According to an embodiment of the present invention, the first light-emitting unit and the second light-emitting unit receive the first light-emitting signal and transmit a first light beam. The first light beam remains lit, indicating that the control unit has received the pressing signal.

According to an embodiment of the present invention, the first light-emitting unit and the second light-emitting unit receive the second light-emitting signal and transmit a second light beam. The second light beam is flashing, indicating the start of the destruction procedure.

DETAILED DESCRIPTION OF THE INVENTION

In order to make the structure and characteristics as well as the effectiveness of the present invention to be further understood and recognized, the detailed description of the present invention is provided as follows along with embodiments and accompanying figures.

It is known that since storage products (SSD) have data security requirements in special applications, the storage and destruction of data have always been a part of attention. However, because most of the one-button destruction functions on the market are either software destruction or hardware destruction, it is not possible to choose with flexibility.

The present invention provides a storage device with one-button destruction function triggered by a physical button. The difference in trigger duration is used to enable the storage controller to determine the destruction method, so that the two destruction methods coexist and have a simple control method. When a user continuously presses a button, a pressing signal is generated and transmitted to the control unit. The control unit obtains a pressing time according to the pressing signal. The control unit determines whether software erasing or hardware erasing is to be executed according to the duration of the pressing time.

In the following description, various embodiments of the present invention are described using figures for describing the present invention in detail. Nonetheless, the concepts of the present invention can be embodied by various forms. Those embodiments are not used to limit the scope and range of the present invention.

Figure 1:
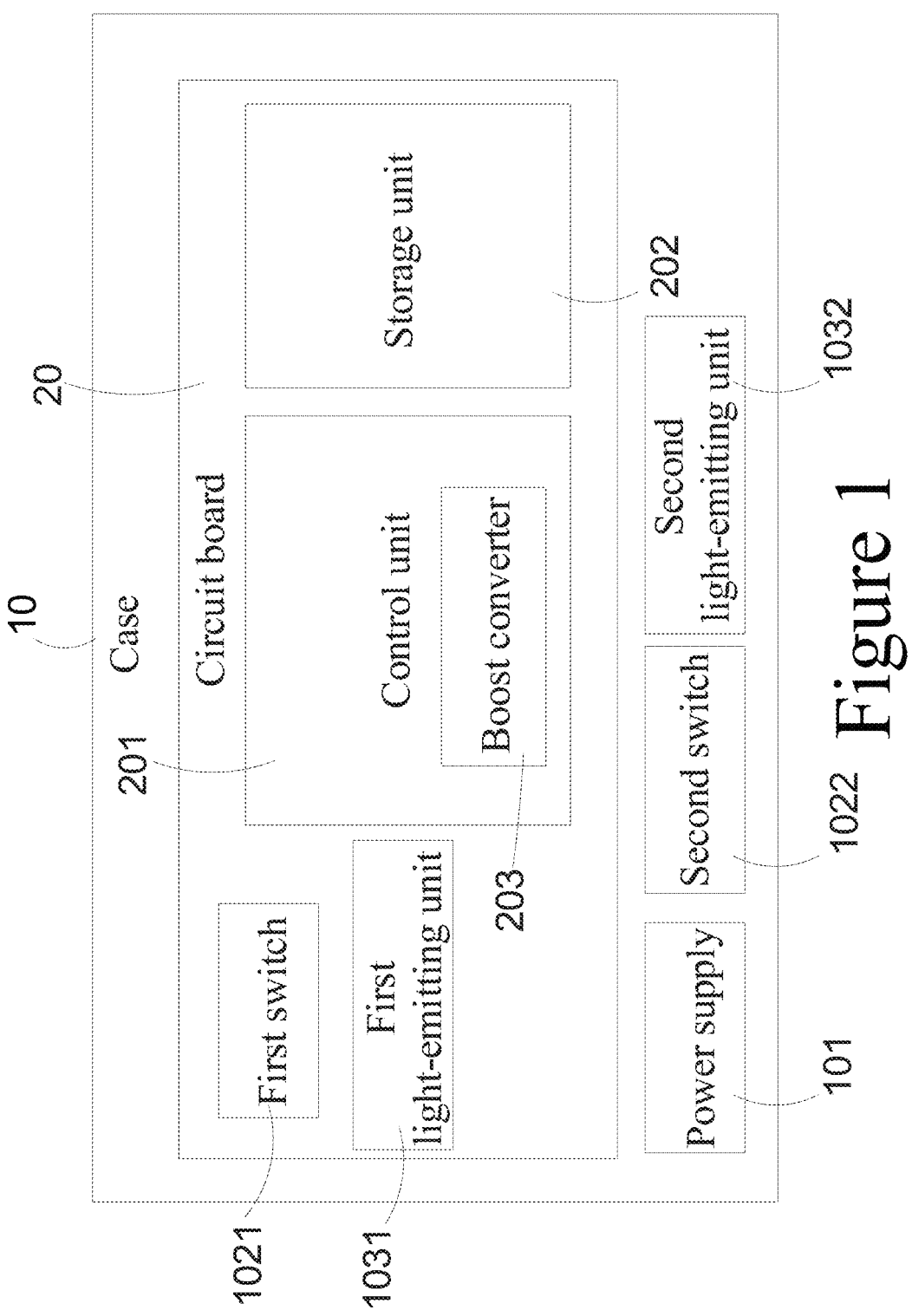
FIG. 1 shows a block diagram of the structure according to the first embodiment of the present invention.
Figure 2:
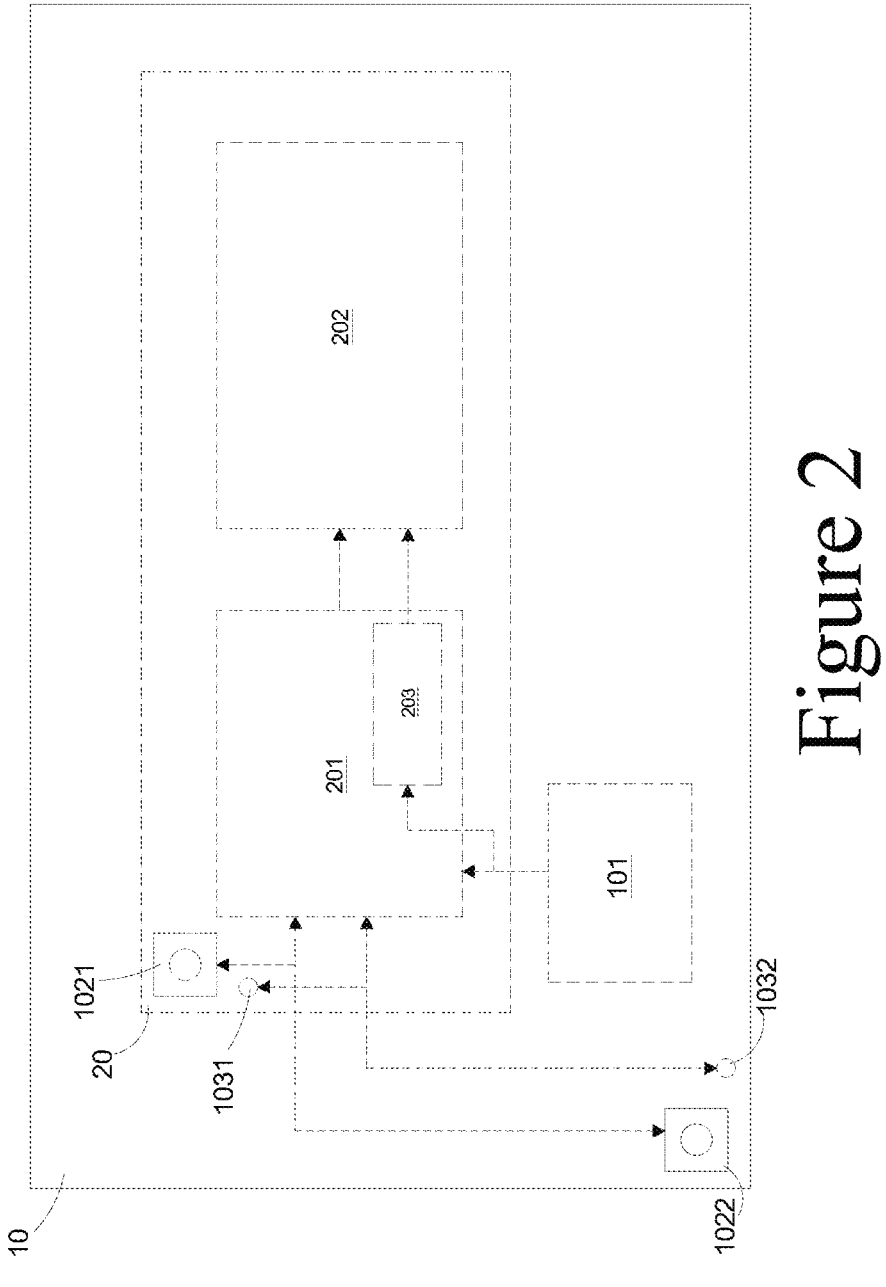
FIG. 2 shows a perspective view of the structure according to the first embodiment of the present invention.
Figure 3:
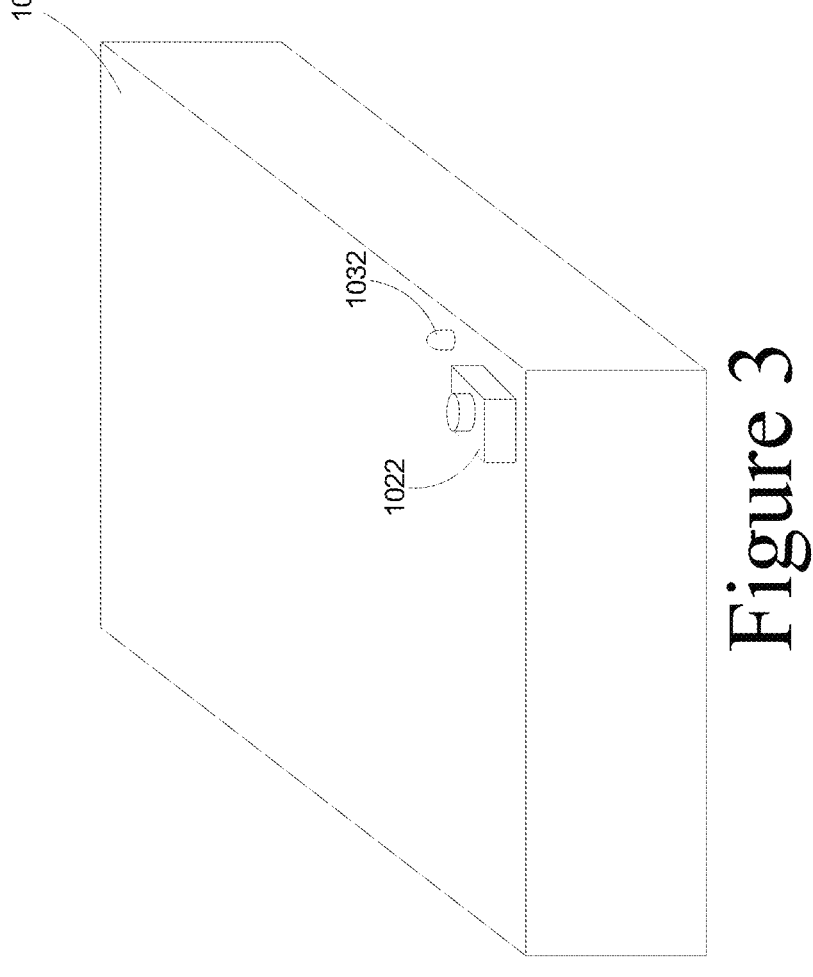
FIG. 3 shows an outside view of the structure according to the first embodiment of the present invention.

Please refer to FIG. 1 to FIG. 3, which show structure diagrams of the storage device with one-button destruction function according to the first embodiment of the present invention. As shown in the figures, the storage device with one-button destruction function according to the present invention comprises a case 10; a second button 1022, disposed on the case 10; a circuit board 20, disposed inside the case 10; a first button 1021, disposed on the circuit board 20; a control unit 201, disposed on the circuit board 20 and connected electrically to the first button 1021 and the second button 1022; a storage unit 202, disposed on the circuit board and connected electrically to the control unit 201; and a boost converter 203, connected electrically to the control unit 201 and the storage unit 202. The storage device 202 further includes a power supply 101, connected electrically to the control unit 201 and the boost converter 203.

The storage unit 202 includes a plurality of storage blocks STB1. Thereby, the control unit 201 controls the storage unit to access data in the plurality of storage blocks according to a built-in mapping table. For example, the control unit 201 writes the received data to the one of the plurality of storage blocks STB1 via a data access channel. After the storage block STB1 is full via the data access channel, the control unit 201 will write the received data to another storage block STB1 and so on. When the last storage block STB1 is full, the control unit 201 will start erasing the plurality of storage blocks STB1 for writing the next data received by the control unit 201. For example, each storage block STB1 includes a plurality of storage cells. For a single storage cell using the MOSFET structure, when a control gate of the cell is biased by an operating voltage and a source, a drain, and a bulk of the cell are connected to the ground (for example, 0V), a binary logic "0" is recorded. When the control gate of the cell is grounded (for example, 0V) and the source, the drain, and the bulk of the cell are connected to the ground (for example, 0V), a binary logic "1" is recorded. To erase data, the control unit 201 applies the ground voltage (for example, 0V) to the control gate and an erasing voltage (for example, a first erasing voltage DS1) to the source, the drain, and the bulk of cell. Then the bit stored in the cell will be erased. Instead of a single storage cell, the control unit 201 uses a whole storage block as the basic unit of erasing data. In other words, each time when the control unit 201 erases data, one of plurality of storage blocks STB1 will be erased. In the erased storage block STIB1, the data recorded in all of the storage cells are the binary logic "1".

A first light-emitting unit 1031 is further disposed on the circuit board 201, and the control unit 201 is connected electrically to the first light-emitting unit 1031.

A second light-emitting unit 1032 is further disposed on the case 10, and the control unit 201 is connected electrically to the second light-emitting unit 1032.

Pressing and holding the first button 1021 or the second button 1022 and generates a pressing signal PS1 to the control unit 201. The control unit 201 obtains a pressing time PST1 according to the pressing signal PS1.

If the pressing time PST1 is smaller than a first time threshold value T1, the control unit 201 transmits a first light-emitting signal LS1 to the first light-emitting unit 1031 and the second light-emitting unit 1032.

If the pressing time PST1 is greater than the first time threshold value T1, the control unit 201 transmits a second light-emitting signal LS2 to the first light-emitting unit 1031 and the second light-emitting unit 1032.

The first time threshold value T1 is smaller than a second time threshold value T2. If the pressing time PST1 is greater than the first time threshold value T1 and smaller than the second time threshold value T2, the control unit 201 transmits a first erasing voltage DS1 to the storage unit 202 for erasing the plurality of storage blocks STB1 of the storage unit 202.

According to the present embodiment, the first erasing voltage DS1 is greater than a threshold voltage STV1 of each of the plurality of storage blocks STB1 and thus making all bits in the corresponding erased storage block SBT1 be all "1" or all "0" and become invalid storage data. Thereby, the original data stored in the erased storage blocks STB1 are cleared. For example, by applying the first erasing voltage DS1 to the storage block STB1 to be erased, all bits therein will be "1", and thus making the data stored in the storage block STB1 become invalid. Thereby, the next data can be written to the erased storage block STB1. That is to say, applying the first erasing voltage DS1 to the storage block STB1 executes data erasing.

If the pressing time PTS1 is greater than the second time threshold value T2, the control unit 201 transmits a second erasing voltage DS2 to the boost converter 203. The boost converter 230 generates a voltage signal HV1 correspondingly to the storage block STB1 of the storage unit 201. The voltage signal HV1 is greater than an operating voltage WV1 of the storage unit 202 for breaking down the corresponding flash cells in the storage unit STB1 of the storage unit 202 and thus executing hardware data destruction. In other words, the second erasing voltage DS2 executes data destruction on the flash cells in the SSD. The control unit 201 manages the data-destroyed flash cells and the normal ones separately. The breakdown flash cells are destroyed completely. There is no means to recover data, and it is not possible to access data.

The operating voltage is different for different brands of SSD, normally being 5V or 3.3V. The operating voltage according to the present invention can be comprehended as the maximum operating voltage of the storage unit.

The first light-emitting unit 1031 and the second light-emitting unit 1032 are light-emitting diodes.

The first light-emitting unit 1031 and the second light-emitting unit 1032 receive the first light-emitting signal LS1 and transmit a first light beam L1.

The first light beam L1 remains lit.

The first light-emitting unit 1031 and the second light-emitting unit 1032 receive the second light-emitting signal LS2 and transmit a second light beam L2.

The second light beam L2 is flashing.

Figure 4:
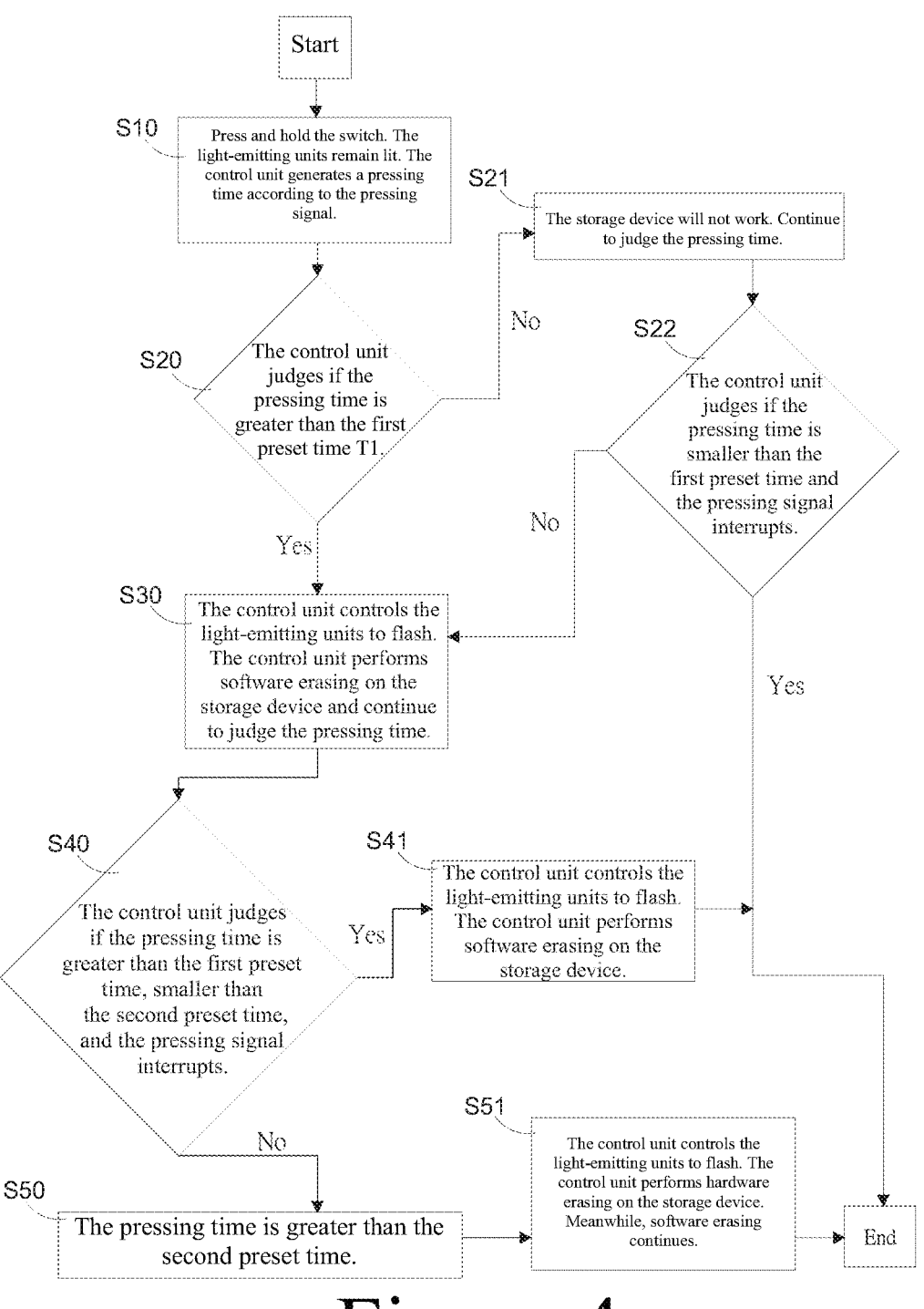
FIG. 4 shows a flowchart according to the second embodiment of the present invention.

Please refer to FIG. 4, which shows a flowchart of the method for determining destruction method of storage device according to the second embodiment of the present invention. As shown in the figure, the method for determining destruction method of storage device according to the present invention comprises the steps described as follows.

In order to reuse flash cells after data erase, the storage device can execute firmware for executing software data erasing, which is another type of hardware data erasing.

The software data erasing means that the control unit 201 of an SSD erases all the stored data in the storage block STB1 excluding the firmware storage block. The advantage is that the normal usage of flash cell can be maintained. Nonetheless, the destruction process takes a longer time; it is not possible to achieve immediate erasing. The control unit 201 write blank data, for example, all binary logic "1" or "0", to the storage block STB1 excluding the firmware storage block.

Step S10: A user continuously presses the first button 1021 or the second button 1022. The control unit 201 transmits the first light-emitting signal LS1 to the first light-emitting unit 1031 and the second light-emitting unit 1032 to make them remain lighting, indicating start of the device. In addition, the pressing signal PS1 is generated and transmitted to the control unit 201 continuously. The control unit 201 obtains the pressing time PST1 according to the pressing signal PS1.

Step S20: The control unit 201 judges if the pressing time PST1 is greater than the first time threshold value T1. If judgement is no, the step S21 is executed; if judgement is yes, the step S30 is executed.

Step S21: The storage device will not work. Continue to judge the pressing time PST1.

Step S22: The control unit 201 judges if the pressing time PST1 is smaller than the first time threshold value T1 and the pressing signal PS1 interrupts. If so, the destruction process ends; if not, the step S30 is executed.

Step S30: The control unit 201 transmits the second light-emitting signal LS2 to the first light-emitting unit 1031 and the second light-emitting unit 1032 to make them flash. The control unit 201 generates and transmits the first erasing voltage DS1 to the storage unit 202 to make the storage unit 202 execute software erasing. Continue to judge the pressing time PST1.

Step S40: The control unit 201 judges if the pressing time PST1 is greater than the first time threshold value T1, smaller than the second time threshold value T2, and the pressing signal PS1 interrupts. If so, the step S41 is executed; if not, the step S50 is executed.

Step S41: The control unit 201 transmits the second light-emitting signal LS2 to the first light-emitting unit 1031 and the second light-emitting unit 1032 to make them flash. The control unit 201 generates and transmits the first erasing voltage DS1 to the storage unit 202 to make the storage unit 202 execute erasing. After erasing is executed, the destruction process ends.

Step S50: A control signal CTR judges that the pressing time PST1 is greater than the second time threshold value T2.

Step S51: The control unit 201 generates and transmits the second erasing voltage DS2 to the boost converter 203 to make the boost converter 203 generate the voltage signal HV1 for breaking down the storage unit 202 and thus executing hardware erasing. Meanwhile, the erasing in the step S41 continues. After erasing, the destruction process ends.

As illustrated in the above embodiments, the present invention provides a storage device with one-button destruction function triggered by a physical button. The difference in trigger duration is used to enable the storage controller to determine the destruction method, so that the two destruction methods coexist and have a simple control method. Thereby, the present invention solves the problem of erasing flexibility because most of the one-button destruction functions according to the prior art are either software destruction or hardware destruction.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A storage device with one-button destruction function, comprising: a circuit board, including a first button disposed thereon;

a control unit, disposed on the circuit board, and connected electrically to said first button;

a storage unit, disposed on said circuit board, and connected electrically to said control unit; and a boost converter, connected electrically to said control unit and said storage unit;

wherein said first button is pressed and generates a pressing signal to said control unit, said control unit obtains a pressing time according to said pressing signal, said control unit transmits a first erasing voltage to said storage unit when the pressing time is greater than a first time threshold value, said first erasing voltage is greater than a threshold voltage of each of a plurality of storage blocks for erasing said plurality of storage blocks, said control unit transmits a second erasing voltage to said boost converter when said pressing time is greater than a second time threshold value, said boost converter generates a voltage signal correspondingly to said storage unit, said storage unit is destructed physically and the data stored in said storage unit is also destructed, while said voltage signal is greater than an operating voltage of said storage unit.

2. The storage device with one-button destruction function of claim 1, wherein an outer side of said storage device further includes:

a case, further including a second button connected electrically to said circuit board;

wherein said second button is pressed and generates said pressing signal to said control unit, said control unit obtains said pressing time according to said pressing signal, said control unit transmits said first erasing voltage to said storage unit when said pressing time is greater than said first time threshold value, said plurality of storage blocks are erased while said first erasing voltage is greater than said threshold voltage of each of said plurality of storage blocks, said control unit transmits said second erasing voltage to said boost converter when said pressing time is greater than said second time threshold value, said boost converter generates said voltage signal correspondingly to said storage unit, said storage unit is destructed while said voltage signal is greater than said operating voltage of said storage unit.

3. The storage device with one-button destruction function of claim 2, further comprising a power supply, disposed inside said case and connected electrically to said control unit and said boost converter.

4. The storage device with one-button destruction function of claim 1, wherein said circuit board further includes a first light-emitting unit disposed thereon, and said control unit is connected electrically to said first light-emitting unit.

5. The storage device with one-button destruction function of claim 2, wherein said case further includes a second light-emitting unit disposed thereon, and said control unit is connected electrically to said second light-emitting unit.

6. The storage device with one-button destruction function of claim 4, wherein if said pressing time is smaller than said first time threshold value, said control unit transmits a first light-emitting signal to said first light-emitting unit or said second light-emitting unit.

7. The storage device with one-button destruction function of claim 5, wherein if said pressing time is smaller than said first time threshold value, said control unit transmits a first light-emitting signal to said first light-emitting unit or said second light-emitting unit.

8. The storage device with one-button destruction function of claim 4, wherein if said pressing time is greater than said first time threshold value, said control unit transmits a second light-emitting signal to said first light-emitting unit or said second light-emitting unit.

9. The storage device with one-button destruction function of claim 5, wherein if said pressing time is greater than said first time threshold value, said control unit transmits a second light-emitting signal to said first light-emitting unit or said second light-emitting unit.

10. The storage device with one-button destruction function of claim 4, wherein said first light-emitting unit or said second light-emitting unit is a light-emitting diode.

11. The storage device with one-button destruction function of claim 5, wherein said first light-emitting unit or said second light-emitting unit is a light-emitting diode.

12. The storage device with one-button destruction function of claim 6, wherein said first light-emitting unit or said second light-emitting unit receives said first light-emitting signal and transmit a first light beam.

13. The storage device with one-button destruction function of claim 7, wherein said first light-emitting unit or said second light-emitting unit receives said first light-emitting signal and transmit a first light beam.

14. The storage device with one-button destruction function of claim 8, wherein said first light-emitting unit or said second light-emitting unit receives said second light-emitting signal and transmit a second light beam.

15. The storage device with one-button destruction function of claim 9, wherein said first light-emitting unit or said second light-emitting unit receives said second light-emitting signal and transmit a second light beam.

* * * * *